(12) United States Patent
Tsuchida et al.

(10) Patent No.: US 11,316,172 B2
(45) Date of Patent: Apr. 26, 2022

(54) FUEL CELL AND METHOD OF MANUFACTURING METAL POROUS BODY

(71) Applicant: Sumitomo Electric Toyama Co., Ltd., Imizu (JP)

(72) Inventors: Hitoshi Tsuchida, Imizu (JP); Junichi Nishimura, Imizu (JP); Seiji Mabuchi, Imizu (JP)

(73) Assignee: SUMITOMO ELECTRIC TOYAMA CO., LTD., Imizu (JP)

( * ) Notice: Subject to any disclaimer, the term of this patent is extended or adjusted under 35 U.S.C. 154(b) by 359 days.

(21) Appl. No.: 16/302,717

(22) PCT Filed: May 10, 2018

(86) PCT No.: PCT/JP2018/018125
§ 371 (c)(1),
(2) Date: Nov. 19, 2018

(87) PCT Pub. No.: WO2019/082424
PCT Pub. Date: May 2, 2019

(65) Prior Publication Data
US 2021/0057762 A1    Feb. 25, 2021

(30) Foreign Application Priority Data

Oct. 25, 2017   (JP) .............................. JP2017-206447

(51) Int. Cl.
*H01M 8/0232*   (2016.01)
*H01M 8/0245*   (2016.01)
(Continued)

(52) U.S. Cl.
CPC ............. *H01M 8/0232* (2013.01); *B21B 1/08* (2013.01); *B22F 3/10* (2013.01); *B22F 3/1137* (2013.01);
(Continued)

(58) Field of Classification Search
CPC ............. H01M 8/0232; H01M 8/0245; H01M 8/0247; H01M 8/0258; H01M 8/026
See application file for complete search history.

(56) References Cited

U.S. PATENT DOCUMENTS

| 6,682,848 B1* | 1/2004 | Yano | ..................... H01M 4/745 |
| | | | 429/206 |
| 2007/0015015 A1* | 1/2007 | Hoshino | ................... C01B 3/38 |
| | | | 429/425 |

(Continued)

FOREIGN PATENT DOCUMENTS

| CN | 1834272 A | 9/2006 |
| EP | 3654428 A1 | 5/2020 |

(Continued)

*Primary Examiner* — Ula C Ruddock
*Assistant Examiner* — Mary Grace Byram
(74) *Attorney, Agent, or Firm* — Faegre Drinker Biddle & Reath LLP

(57) ABSTRACT

A fuel cell according to the present disclosure includes a flat plate-shaped metal porous body having a framework of a three-dimensional network structure as a gas diffusion layer.

(Continued)

The framework is made of metal or alloy. In the metal porous body, a ratio of an average pore diameter in a direction parallel to a gas flow direction to an average pore diameter in a direction perpendicular to the gas flow direction is greater than or equal to 1.4 and less than or equal to 2.5.

7 Claims, 3 Drawing Sheets

(51) Int. Cl.
| | |
|---|---|
| *H01M 8/0247* | (2016.01) |
| *B22F 5/00* | (2006.01) |
| *B22F 3/11* | (2006.01) |
| *B22F 3/10* | (2006.01) |
| *C22C 1/08* | (2006.01) |
| *B21B 1/08* | (2006.01) |
| *B22F 3/18* | (2006.01) |
| *C22C 1/04* | (2006.01) |
| *H01M 4/80* | (2006.01) |

(52) U.S. Cl.
CPC ............... *B22F 3/18* (2013.01); *B22F 5/006* (2013.01); *C22C 1/0416* (2013.01); *C22C 1/08* (2013.01); *H01M 4/80* (2013.01); *H01M 8/0245* (2013.01); *H01M 8/0247* (2013.01); *B22F 2201/03* (2013.01); *B22F 2998/10* (2013.01); *B22F 2999/00* (2013.01); *Y02E 60/10* (2013.01); *Y02E 60/50* (2013.01)

(56) References Cited

U.S. PATENT DOCUMENTS

| | | | |
|---|---|---|---|
| 2008/0086871 A1* | 4/2008 | Rohland | ................ B32B 37/22 |
| | | | 29/623.1 |
| 2009/0047422 A1* | 2/2009 | Nakanishi | ........... H01M 4/8814 |
| | | | 427/115 |
| 2013/0045425 A1 | 2/2013 | Hosoe et al. | |
| 2016/0079006 A1* | 3/2016 | Hosoe | ................... H01G 11/06 |
| | | | 429/211 |
| 2017/0373324 A1* | 12/2017 | Noda | ...................... H01M 4/88 |
| 2018/0219232 A1 | 8/2018 | Okuno et al. | |

FOREIGN PATENT DOCUMENTS

| | | | | |
|---|---|---|---|---|
| JP | 2003-272638 A | 9/2003 | | |
| JP | 2015-060643 A | 3/2015 | | |
| JP | 2015-526840 A | 9/2015 | | |
| JP | 2017-033917 A | 2/2017 | | |
| JP | 2017-33918 A | 2/2017 | | |
| WO | WO 2007/121659 A1 | 11/2007 | | |
| WO | WO-2013/188568 A1 | 12/2013 | | |
| WO | WO-2014181809 A1 * | 11/2014 | ............. | H01G 11/36 |
| WO | WO-2016080019 A1 * | 5/2016 | .......... | H01M 4/8875 |

\* cited by examiner

FUEL CELL AND METHOD OF MANUFACTURING METAL POROUS BODY

TECHNICAL FIELD

The present disclosure relates to a fuel cell and a method of manufacturing a metal porous body. This application claims priority based on Japanese Patent Application No. 2017-206447 filed on Oct. 25, 2017. All descriptions described in Japanese Patent Application No. 2017-206447 are incorporated herein by reference.

BACKGROUND ART

In recent years, there is a demand for higher output and higher capacity (miniaturization) in various batteries, capacitors, fuel cells, and the like.

Typically, a carbon structure or a stainless steel (SUS) structure is used in a gas diffusion layer of a fuel cell. A groove serving as a gas flow path is formed in the carbon structure and the SUS structure. The groove has a width of about 500 μm, and the groove is linearly connected. Because the groove is provided for about a half of a surface area in which the carbon structure or the SUS structure is in contact with an electrolyte, the gas diffusion layer has porosity of about 50%.

The gas diffusion layer does not have high porosity, but has a large pressure loss. For this reason, in order that the output is increased while the size of the fuel cell is reduced, use of a metal porous body having a framework of a three-dimensional network structure instead of the carbon structure or the SUS structure as the gas diffusion layer is proposed.

For example, National Patent Publication No. 2015-526840 (Patent Literature 1) discloses the use of the porous metal material containing a metal foam as an open porous flow structure used in an electrochemical cell.

Japanese Patent Laying-Open No. 2017-033918 (Patent Literature 2) discloses a fuel cell in which a flat plate-shaped metal porous body having a framework of a three-dimensional network structure containing nickel (Ni) and tin (Sn) is used as the gas diffusion layer.

For example, a resin molded body having the framework of the three-dimensional network structure is subjected to conduction treatment, metal is plated on a surface of the framework, and a resin molded body is removed, thereby preparing the metal porous body having the framework of the three-dimensional network structure. A resin foam is preferably used as the resin molded body. In particular, from the viewpoint of increasing porosity of the metal porous body, the metal porous body is manufactured using foamed urethane having the porosity of about 98% as a starting material. A metal plating layer is appropriately reduced after the removal of the resin molded body.

Mechanical processing (such as pressing, rolling, coining, and forging) is performed as needed, and the metal porous body is compressed so as to have a thickness greater than or equal to about 0.30 mm and less than or equal to about 0.50 mm. Because the metal porous body is compressed to decrease the porosity, preferably the porosity of the metal porous body before compression is greater than or equal to 50%, and more preferably ranging from about 75% to about 85%.

CITATION LIST

Patent Literature

PTL 1: National Patent Publication No. 2015-526840
PTL 2: Japanese Patent Laying-Open No. 2017-033918

SUMMARY OF INVENTION

According to one aspect of the present disclosure, a fuel cell includes a flat plate-shaped metal porous body having a framework of a three-dimensional network structure as a gas diffusion layer. The framework is made of metal or alloy, and in the metal porous body, a ratio (X/Y) of an average pore diameter (X) in a direction parallel to a gas flow direction to an average pore diameter (Y) in a direction perpendicular to the gas flow direction is greater than or equal to 1.4 and less than or equal to 2.5.

DETAILED DESCRIPTION

Figure 1:
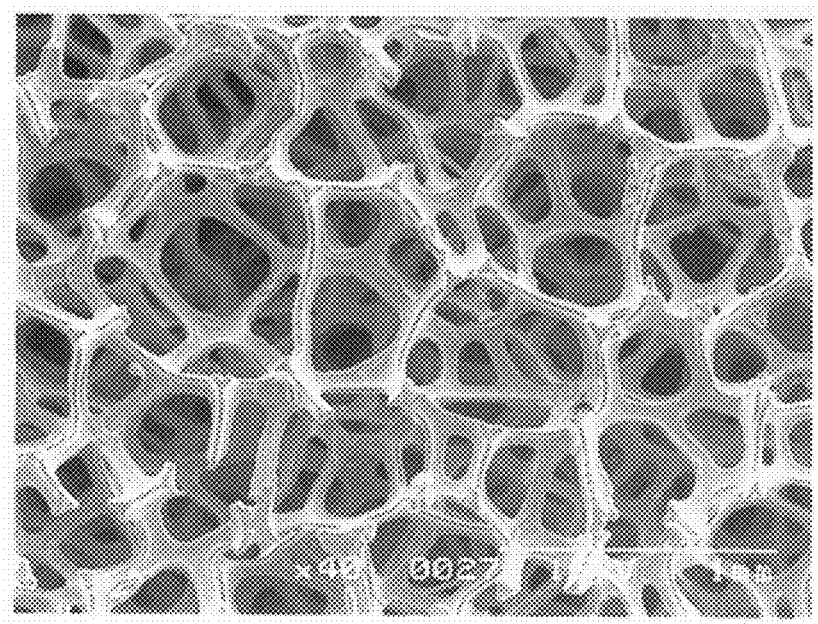
FIG. 1 is an enlarged photograph illustrating a structure of a framework of an example of a metal porous body having a framework of a three-dimensional network structure.

Problem to be Solved by the Present Disclosure

Typically, a carbon structure or a stainless steel (SUS) structure is used in a gas diffusion layer of a fuel cell. A groove serving as a gas flow path is formed in the carbon structure and the SUS structure. The groove has a width of about 500 μm, and the groove is linearly connected. Because the groove is provided for about a half of a surface area in which the carbon structure or the SUS structure is in contact with an electrolyte, the gas diffusion layer has porosity of about 50%. On the other hand, because the metal porous body having the framework of the three-dimensional network structure has very high porosity, the metal porous body can be used as the gas diffusion layer and a current collector of the fuel cell, the pressure loss is decreased, and the gas can flow uniformly, so that fuel utilization can be improved.

Preferably, the thickness of the metal porous body is reduced from the viewpoint of miniaturizing the fuel cell. However, when the thickness of the metal porous body is reduced, the pressure loss is increased in feeding a fuel gas into the fuel cell. Although it is effective to increase a pore diameter of the metal porous body in order to decrease the pressure loss, framework density is lowered when the pore diameter is increased. Consequently, the number of contact points between an electrolyte and the metal porous body is decreased to increase resistance in the case where the metal porous body is also used as the current collector. For the metal porous body having a low weight per area, when the metal porous body is used while rolled thinly, a pore in a vicinity of the center in the thickness direction is preferentially crushed during rolling, the pressure loss is increased, or the gas flow path becomes nonuniform in the thickness direction.

An object of the present disclosure is to provide a fuel cell in which the metal porous body is used as the gas diffusion layer and the current collector, the fuel cell having the metal porous body with a small pore diameter, the uniform gas flow path, and small pressure loss.

Advantageous Effect of the Present Disclosure

According to the present disclosure, the fuel cell can be provided in which the metal porous body is used as the gas diffusion layer and the current collector, the fuel cell having the metal porous body with a small pore diameter, the uniform gas flow path, and small pressure loss.

DESCRIPTION OF EMBODIMENTS

An embodiment of the present disclosure will first be described.

(1) According to one aspect of the present disclosure, a fuel cell includes a flat plate-shaped metal porous body having a framework of a three-dimensional network structure as a gas diffusion layer. The framework is made of metal or alloy, and in the metal porous body, a ratio (X/Y) of an average pore diameter (X) in a direction parallel to a gas flow direction to an average pore diameter (Y) in a direction perpendicular to the gas flow direction is greater than or equal to 1.4 and less than or equal to 2.5.

According to the above (1), the fuel cell can be provided in which the metal porous body is used as the gas diffusion layer and the current collector, the fuel cell having the metal porous body with a small pore diameter, the uniform gas flow path, and small pressure loss.

(2) In the fuel cell described in the above (1), preferably, a ratio (X/Z) of the average pore diameter (X) in the direction parallel to the gas flow direction of the metal porous body to an average pore diameter (Z) in a thickness direction of the metal porous body is greater than or equal to 2.0 and less than or equal to 4.0.

According to the above (2), in the metal porous body that is the gas diffusion layer, all spaces in the thickness direction of the uniformly distributed pores can be utilized as a gas flow path, so that the gas can uniformly be supplied to the whole surface of the electrolyte as compared with a gas diffusion layer of a conventional groove type gas flow path.

(3) In the fuel cell described in the above (1) or (2), preferably, a ratio (Zmax/Zmin) of a maximum value (Zmax) to a minimum value (Zmin) of a pore diameter in the thickness direction of the metal porous body is less than or equal to 2.0.

According to the above (3), the pressure loss of the fuel gas is not increased even if the thickness of the metal porous body that is the gas diffusion layer is further reduced, so that more compact and high-output fuel cell can be provided.

(4) According to another aspect of the present disclosure, in a method of manufacturing a metal porous body, a flat plate-shaped metal porous body having a framework of a three-dimensional network structure is compressed and rolled in a thickness direction, the framework being made of metal or alloy, such that a ratio ($S_X/S_Y$) of an average pore diameter ($S_X$) in a major axis direction to an average pore diameter ($S_Y$) in a minor axis direction of a pore viewed from a main surface of the metal porous body after the rolling is greater than or equal to 1.4 and less than or equal to 2.5.

According to the above (4), the metal porous body capable of miniaturizing the fuel cell and increasing the output of the fuel cell when used as the gas diffusion layer of the fuel cell can be provided.

(5) In the method of manufacturing a metal porous body described in the above (4), preferably, the rolling is performed such that a ratio ($S_X/S_Z$) of the average pore diameter ($S_X$) in the major axis direction of the pore viewed from the main surface of the metal porous body after the rolling to an average pore diameter ($S_Z$) in the thickness direction viewed from a side surface is greater than or equal to 2.0 and less than or equal to 4.0.

According to the above (5), the metal porous body capable of further decreasing the pressure loss of the fuel gas when the metal porous body is used as the gas diffusion layer of the fuel cell can be provided.

(6) In the method of manufacturing a metal porous body described in the above (4) or (5), preferably, the rolling is performed such that a ratio ($S_Z$max/$S_Z$min) of a maximum value ($S_Z$max) to a minimum value ($S_Z$min) of the pore diameter in the thickness direction viewed from the side surface of the metal porous body after the rolling is less than or equal to 2.0.

According to the above (6), the metal porous body capable of further reducing the thickness of the gas diffusion layer and decreasing the pressure loss of the fuel gas when the metal porous body is used as the gas diffusion layer of the fuel cell can be provided.

(7) In the method of manufacturing a metal porous body described in any one of the above (4) to (6), preferably, the rolling is performed using a rolling roller having a diameter greater than or equal to 300 mm.

According to the above (7), the metal porous body having more uniform pore diameter of each pore (cell) in the thickness direction can be provided.

Details of Embodiments

A specific example of a fuel cell according to an embodiment of the present disclosure will be described below. The present invention is not limited to the example, but includes meanings equivalent to the claims and all changes within the scope.

<Fuel Cell>

A fuel cell according to an embodiment of the present disclosure includes a flat plate-shaped metal porous body (hereinafter, also simply referred to as "metal porous body") having a framework of a three-dimensional network structure as a gas diffusion layer. A type of the fuel cell is not particularly limited, but may be a solid polymer type fuel cell or a solid oxide type fuel cell.

Metal or alloy constituting the framework of the metal porous body may be appropriately selected according to use conditions such as temperature and atmosphere during operation of the fuel cell. For example, the metal porous body in which the framework is formed by the metal or alloy mainly containing nickel or aluminum or the metal porous body in which the framework is formed by the metal or alloy mainly containing titanium can be used as the gas diffusion layer.

The term "mainly containing" means that an occupied proportion is the largest in the metal or alloy.

Configurations of a known fuel cell can be adopted as other configurations except for the gas diffusion layer.

For example, a commercially available membrane-electrode assembly in which an ion exchange membrane and a catalyst layer are bonded together can directly be used for a polymer electrolyte fuel cell. The metal porous body is disposed as the gas diffusion layer at both ends of the membrane-electrode assembly, and acts as a hydrogen electrode or an air electrode by supplying hydrogen or air (oxygen).

For a solid oxide fuel cell, the metal porous body is disposed as the gas diffusion layer at both ends of a solid electrolyte layer made of a solid oxide, and hydrogen or air (oxygen) is supplied to form a hydrogen electrode, and acts as the hydrogen electrode or the air electrode by supplying hydrogen or air (oxygen).

The metal porous body can act not only as the gas diffusion layer but also as a current collector.

(Metal Porous Body)

A configuration of the metal porous body used as the gas diffusion layer will be described in detail below.

Figure 2:
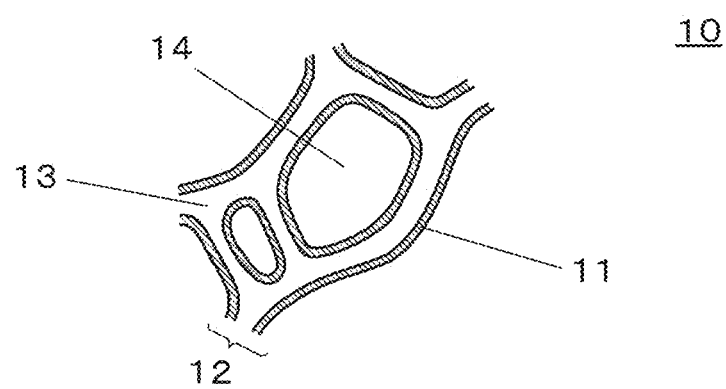
FIG. 2 is an enlarged view illustrating an outline of a partial cross-section of the example of the metal porous body having the framework of the three-dimensional network structure.

The metal porous body has the framework of the three-dimensional network structure, and has a flat plate shape as a whole. FIG. 1 is an enlarged photograph illustrating the framework of the three-dimensional network structure of an example of the metal porous body. FIG. 2 is an enlarged schematic view illustrating a cross-section of the metal porous body in FIG. 1.

In the case where a shape of the framework has the three-dimensional network structure, a framework 12 of a metal porous body 10 typically has a hollow inside 13 as illustrated in FIG. 2. Framework 12 is made of metal or alloy 11. Metal porous body 10 includes a continuous pore, and a pore 14 is formed by framework 12.

Figure 3:
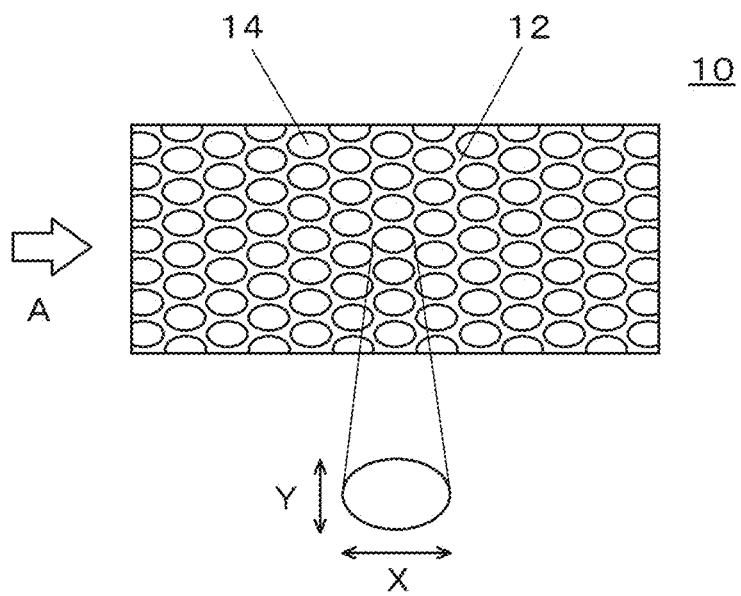
FIG. 3 is a view illustrating an outline of a main surface of the example of the metal porous body having the framework of the three-dimensional network structure.

FIG. 3 is a schematic view illustrating a main surface of an example of the metal porous body. In FIG. 3, a direction perpendicular to the plane of drawing is a thickness direction of the metal porous body.

As illustrated in FIG. 3, pore 14 of the main surface of the metal porous body has an elliptical shape in which a major axis is a direction parallel to a flow direction A of the gas supplied in the fuel cell. Specifically, a ratio (X/Y) of an average pore diameter (X) in the direction parallel to a gas flow direction A to an average pore diameter (Y) in the direction perpendicular to gas flow direction A is greater than or equal to 1.4 and less than or equal to 2.5. A gas pressure loss cannot sufficiently be decreased when X/Y is less than 1.4. The shape of pore 14 varies when X/Y is more than 2.5. That is, in the case where the metal or alloy is plated by forcedly stretching the resin molded body as a base material in manufacturing the metal porous body, a waving shape is generated in a Y-direction, and a gas flow path in the Y-direction tends to become nonuniform. In the case where the metal porous body extends forcedly in one direction such that X/Y is more than 2.5, a broken portion is generated in the framework of the metal porous body, which becomes an obstacle when the gas flows. From this viewpoint, preferably X/Y is greater than or equal to 1.4 and less than or equal to 2.0, and more preferably greater than or equal to 1.4 and less than or equal to 1.8.

The average pore diameter (X, Y, Z) of the metal porous body refers to an average in which the pore diameters in the X direction, the Y-direction, or the Z-direction of any 100 pores are measured by observing the surface of the metal porous body with a microscope.

Power generation efficiency is increased as the gas diffuses more in the gas diffusion layer of the fuel cell. Gas diffusivity is determined by a collision probability between the framework of the gas diffusion layer and the gas.

Because the metal porous body including the framework of the three-dimensional network structure has a complicated shape of the framework, the supplied gas is complicatedly reflected by coining into contact with the framework, and a collision probability becomes high. For this reason, the gas diffusivity becomes high using the metal porous body as the gas diffusion layer of the fuel cell, and output of the fuel cell can be improved. Retention of liquid water can be prevented in the gas diffusion layer.

The ratio (X/Y) of the average pore diameter (X) of the metal porous body in the direction parallel to gas flow direction A to the average pore diameter (Y) of the metal porous body in the direction orthogonal to the gas flow direction is greater than or equal to 1.4 and less than or equal to 2.5, which allows the pressure loss of the gas to be decreased. This effect can be obtained even by decreasing the thickness of the metal porous body, so that the fuel cell according to the embodiment of the present disclosure can be made compact and have high output.

Figure 4:
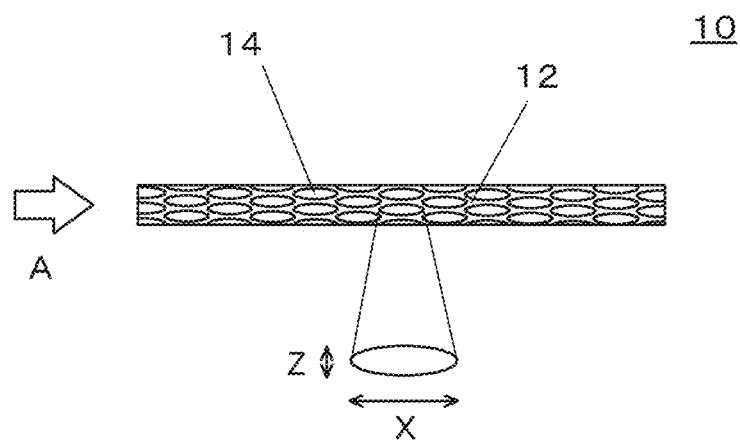
FIG. 4 is a view illustrating an outline of a side surface of the metal porous body in FIG. 3.

FIG. 4 is a schematic view illustrating the metal porous body in FIG. 3 when the metal porous body is viewed from a side surface.

As illustrated in FIG. 4, in pore 14 in the side surface of the metal porous body, a ratio (X/Z) of the average pore diameter (X) in the direction parallel to the flow direction A of the gas supplied in the fuel cell to the average pore diameter (Z) in the thickness direction of the metal porous body is greater than or equal to 2.0 and less than or equal to 4.0. The pressure loss of the gas can be further decreased when X/Z is greater than or equal to 2.0. X/Z is less than or equal to 4.0 which allows the manufacturing cost of the metal porous body to be reduced. From this viewpoint, preferably X/Z is greater than or equal to 2.5 and less than or equal to 4.0, and more preferably greater than or equal to 2.5 and less than or equal to 3.5.

In the fuel cell of the embodiment of the present disclosure, the gas diffusion layer is configured by the metal porous body, so that all the spaces in the thickness direction of the uniformly distributed pores can be used as a gas flow path. Consequently, the gas can uniformly be supplied to the whole surface of the electrolyte, so that high efficiency of the reaction can be promoted to improve power density of the fuel cell. When the thinly-rolled metal porous body having low metal density (that is, the metal porous body having a low weight per area) is used as the gas diffusion layer, normally the pore near the center in the thickness direction is preferentially crushed during rolling, so that the flow path of the gas diffusion layer becomes nonuniform to increase the pressure loss of the gas. Therefore, in the case where the metal porous body having the nonuniform pore diameter in the thickness direction is used as the gas diffusion layer, it is necessary to increase power of oxygen and hydrogen. On the other hand, for the uniform metal porous body having small variation of the pore diameter in the thickness direction, the pressure loss is smaller, so that power cost of the gas can be reduced. That is, in the fuel cell of the embodiment of the present disclosure, the gas diffusion layer has the small pressure loss of the gas, so that the size of the fuel cell and the power cost of the gas can be reduced. Further, the gas can uniformly be supplied to the whole surface of the electrolyte by making the gas flow path uniform within the thickness of the metal porous body, so that the performance of the fuel cell can be improved to increase the output.

In the metal porous body, preferably, a ratio (Zmax/Zmin) of a maximum value (Zmax) to a minimum value (Zmin) of the pore diameter in the thickness direction is less than or equal to 2.0. Consequently, because the pore diameter of the pore in the thickness direction of the metal porous body becomes more uniform, the supplied gas can uniformly be diffused, and the pressure loss of the gas can further be decreased. More preferably, the ratio (Zmax/Zmin) of the maximum value (Zmax) to the minimum value (Zmin) of the pore diameter in the thickness direction of the metal porous body is less than or equal to 1.5, further preferably, the ratio (Zmax/Zmin) is less than or equal to 1.3.

For the polymer electrolyte fuel cell, water is generated at the air electrode. When the pore diameter in the thickness direction of the metal porous body used as the gas diffusion layer and the current collector is nonuniform, a water clogging phenomenon may be generated. When the ratio (Zmax/Zmin) of the maximum value (Zmax) to the minimum value (Zmin) of the pore diameter in the thickness direction of the metal porous body is set less than or equal to 2.0, the metal porous body having high porosity and improved drainability can be obtained.

Framework 12 of the metal porous body may be made of metal or alloy 11. In the hydrogen electrode of the fuel cell, the metal porous body having the framework made of metal mainly containing nickel can be used as the gas diffusion layer. On the other hand, the gas diffusion layer of the air electrode becomes an oxidizing atmosphere at high temperature, so that the framework of the metal porous body is preferably made of an oxidation resistant alloy. Examples of oxidation resistant alloys mainly containing nickel include NiCr (nickel chromium), NiSn (nickel tin), NiSnCr (nickel tin chrome), NiW (nickel tungsten), and NiSnFe (nickel tin iron).

Preferably, the porosity of the metal porous body is greater than or equal to 50% and less than or equal to 98%. The metal porous body can be made extremely lightweight when the porosity of the metal porous body is greater than or equal to 50%, furthermore, the gas diffusivity is further enhanced in the case where the metal porous body having the porosity of greater than or equal to 50% is used as the gas diffusion layer of the fuel cell. The porosity of the metal porous body is less than or equal to 98%, which allows the metal porous body to have the sufficient strength. From the viewpoint, preferably the porosity of the metal porous body is greater than or equal to 70% and less than or equal to 98%, and more preferably greater than or equal to 80% and less than or equal to 98%.

The porosity of the metal porous body is defined by the following equation.

porosity=(1−(mass of porous material[$g$]/(volume of porous material[$cm^3$]×material density[$g/cm^3$]))× 100[%]

Preferably, a thickness of the metal porous body is greater than or equal to 250 μm and less than or equal to 1000 μm. When the thickness of the metal porous body is greater than or equal to 250 μm, the metal porous body has sufficient strength and high gas diffusion performance when being used as the gas diffusion layer of the fuel cell. A lightweight metal porous body can be obtained when the thickness of the metal porous body is less than or equal to 1000 μm. From the viewpoint, preferably the thickness of the metal porous body is greater than or equal to 250 μm and less than or equal to 750 μm, and more preferably greater than or equal to 250 μm and less than or equal to 500 μm.

In a thickness direction of the metal porous body, preferably the number of the pores is about 2 or 3, and more preferably greater than or equal to 2.4. When the number of the pores is greater than or equal to 2, breakage is hardly generated at the portion constituting the connection hole. When the number of the pores is less than or equal to 3, the thickness of the framework made of the metal or alloy can easily become uniform.

Preferably, the average pore diameter (X) of the metal porous body is greater than or equal to 350 μm and less than or equal to 1000 μm. The strength of the metal porous body can be increased when the average pore diameter (X) is greater than or equal to 350 μm, furthermore, the gas diffusivity can be enhanced when the metal porous body is used as the gas diffusion layer of the fuel cell. The average pore diameter (X) is less than or equal to 1000 μm, which allows bendability of the metal porous body to be enhanced. From the viewpoint, preferably the average pore diameter (X) of the metal porous body is greater than or equal to 400 μm and less than or equal to 700 μm, and more preferably greater than or equal to 450 μm and less than or equal to 600 μm.

Preferably, the average pore diameter (Y) of the metal porous body is greater than or equal to 250 μm and less than or equal to 750 μm. The strength of the metal porous body can be increased when the average pore diameter (Y) is greater than or equal to 250 μm, furthermore, the gas diffusivity can be enhanced in the case where the metal porous body is used as the gas diffusion layer of the fuel cell. The average pore diameter (Y) is less than or equal to 750 μm, which allows the bendability of the metal porous body to be enhanced. From the viewpoint, preferably the average pore diameter (Y) of the metal porous body is greater than or equal to 300 μm and less than or equal to 700 μm, and more preferably greater than or equal to 300 μm and less than or equal to 450 μm.

Preferably, the average pore diameter (Z) of the metal porous body is greater than or equal to 100 μm and less than or equal to 400 μm. The strength of the metal porous body can be increased when the average pore diameter (Z) is greater than or equal to 100 μm, furthermore, the gas diffusivity can be enhanced in the case where the metal porous body is used as the gas diffusion layer of the fuel cell. The average pore diameter (Z) is less than or equal to 400 μm, which allows the bendability of the metal porous body to be enhanced. From the viewpoint, preferably the average pore diameter (Z) of the metal porous body is greater than or equal to 100 μm and less than or equal to 350 μm, and more preferably greater than or equal to 100 μm and less than or equal to 250 μm.

<Method of Manufacturing Metal Porous Body>

For example, the metal porous body used in the fuel cell of the embodiment of the present disclosure is manufactured by compressing and rolling the flat plate-shaped metal porous body having the framework of the three-dimensional network structure and having the framework made of the metal or alloy in the thickness direction. In compressing the metal porous body in the thickness direction, the ratio ($S_X/S_Y$) of the average pore diameter ($S_X$) in the major axis direction to the average pore diameter ($S_Y$) in the minor axis direction of the pore viewed from the main surface of the metal porous body after the rolling may be greater than or equal to 1.4 and less than or equal to 2.5.

The major axis direction of the pore viewed from the main surface of the metal porous body may be set parallel to the gas flow direction in order to use the metal porous body obtained by a method of manufacturing a metal porous body of the embodiment of the present disclosure as the gas diffusion layer of the fuel cell.

When the ratio ($S_X/S_Y$) of the average pore diameter ($S_X$) in the major axis direction to the average pore diameter ($S_Y$) in the minor axis direction of the pore viewed from the main surface of the metal porous body is less than 1.4, the pressure loss of the gas cannot be sufficiently decreased in the case where the metal porous body is used as the gas diffusion layer of the fuel cell. The shape of pore 14 varies when $S_X/S_Y$ exceeds 2.5. That is, in the case where the metal or alloy is plated by forcedly stretching the resin molded body as a base material in manufacturing the metal porous body, a waving shape is generated in a minor axis direction, and a gas flow path in the minor axis direction tends to become nonuniform. In the case where the metal porous body extends forcedly in one direction such that $S_X/S_Y$ exceeds 2.5, the broken portion is generated in the framework of the metal porous body, which becomes an obstacle when the gas flows. From this viewpoint, preferably $S_X/S_Y$ is greater than or equal to 1.4 and less than or equal to 2.0, and more preferably greater than or equal to 1.4 and less than or equal to 1.8.

In the method of manufacturing a metal porous body of the embodiment of the present disclosure, preferably, the rolling is performed such that the ratio ($S_X/S_Z$) of the average pore diameter ($S_X$) in the major axis direction or the pore viewed from the main surface of the metal porous body after the rolling to the average pore diameter ($S_Z$) in the thickness direction viewed from the side surface is greater than or equal to 2.0 and less than or equal to 4.0. The thickness direction refers to the thickness direction of the metal porous body.

The pressure loss of the gas can be further decreased when $S_X/S_Z$ is greater than or equal to 2.0. $S_X/S_Z$ is less than or equal to 4.0, which allows the manufacturing cost of the metal porous body to be reduced. From this viewpoint, preferably $S_X/S_Z$ is greater than or equal to 2.5 and less than or equal to 4.0, and more preferably greater than or equal to 2.5 and less than or equal to 3.5.

The average pore diameter ($S_X$, $S_Y$, $S_Z$) of the metal porous body refers to an average in which the pore diameters in the major axis direction, the minor axis direction, or the thickness direction of the metal porous body of any 100 elliptical pores are measured by observing the surface of the metal porous body with a microscope.

In the method of manufacturing a metal porous body of the embodiment of the present disclosure, preferably, the rolling is performed such that the ratio ($S_Z$max/$S_Z$min) of the maximum pore diameter ($S_Z$max) to the minimum pore diameter ($S_Z$min) in the thickness direction viewed from the side surface of the metal porous body after the rolling is less than or equal to 2.0. Consequently, because the pore diameter of the pore in the thickness direction of the metal porous body becomes more uniform, the supplied gas can uniformly be diffused and the pressure loss of the gas can further be decreased in the case where the metal porous body is used as the gas diffusion layer of the fuel cell. More preferably, the ratio ($S_Z$max/$S_Z$min) of the maximum pore diameter ($S_Z$max) to the minimum pore diameter ($S_Z$min) of the pore diameter in the thickness direction viewed from the side surface of the metal porous body is less than or equal to 1.5, and further preferably less than or equal to 1.3.

The porosity of the metal porous body after the rolling is not particularly limited, but may be, for example, greater than or equal to 50% and less than or equal to 98%. The metal porous body can be made extremely lightweight when the porosity of the metal porous body is greater than or equal to 50%, furthermore, the gas diffusivity is further enhanced and the pressure loss of the gas can be decreased in the case where the metal porous body having the porosity of greater than or equal to 50% is used as the gas diffusion layer of the fuel cell. The porosity of the metal porous body is less than or equal to 98%, which allows the metal porous body to have the sufficient strength. From the viewpoint, preferably the porosity of the metal porous body is greater than or equal to 70% and less than or equal to 98%, and more preferably greater than or equal to 80% and less than or equal to 98%.

The porosity of the metal porous body before the rolling is greater than or equal to about 90% and less than or equal to about 99%, preferably greater than or equal to 95% and less than or equal to 98%, and more preferably greater than or equal to 96% and less than or equal to 97%.

Preferably, the thickness of the metal porous body after the rolling is greater than or equal to 250 μm and less than or equal to 1000 μm. When the thickness of the metal porous body is greater than or equal to 250 μm, the metal porous body has sufficient strength and high gas diffusion performance when being used as the gas diffusion layer of the fuel cell. A lightweight metal porous body can be obtained when the thickness of the metal porous body is less than or equal to 1000 μm. From the viewpoint, preferably the thickness of the metal porous body is greater than or equal to 250 μm and less than or equal to 750 μm, and more preferably greater than or equal to 250 μm and less than or equal to 500 μm.

Preferably, the thickness of the metal porous body before the rolling is greater than or equal to 500 μm and less than or equal to 5000 μm, more preferably greater than or equal to 800 μm and less than or equal to 3000 μm, and still more preferably greater than or equal to 1100 μm and less than or equal to 2200 μm.

In the thickness direction of the metal porous body after the rolling, preferably the number of the pores is about 2 or 3, and more preferably greater than or equal to 2.4. When the number of the pores is greater than or equal to 2, breakage is hardly generated at the portion constituting the connection hole. When the number of the pores is less than or equal to 3, the thickness of the framework made of the metal or alloy can easily become uniform.

Preferably, the average pore diameter ($S_X$) in the major axis direction of the pore viewed from the main surface of the metal porous body after the rolling is greater than or equal to 350 μm and less than or equal to 1000 μm. The strength of the metal porous body can be increased when the average pore diameter ($S_X$) is greater than or equal to 350 μm, furthermore, the gas diffusivity can be enhanced when the metal porous body is used as the gas diffusion layer of the fuel cell. The average pore diameter ($S_X$) is less than or equal to 1000 μm, which allows bendability of the metal porous body to be enhanced. From the viewpoint, preferably the average pore diameter ($S_X$) of the metal porous body is greater than or equal to 400 μm and less than or equal to 700 μm, and more preferably greater than or equal to 450 μm and less than or equal to 600 μm.

Preferably, the average pore diameter ($S_Y$) in the minor axis direction of the pore viewed from the main surface of the metal porous body after the rolling is greater than or equal to 250 μm and less than or equal to 750 μm. The strength of the metal porous body can be increased when the average pore diameter ($S_Y$) is greater than or equal to 250

μm, furthermore, the gas diffusivity can be enhanced when the metal porous body is used as the gas diffusion layer of the fuel cell. The average pore diameter ($S_Y$) is less than or equal to 750 μm, which allows the bendability of the metal porous body to be enhanced. From the viewpoint, preferably the average pore diameter ($S_Y$) of the metal porous body is greater than or equal to 300 μm and less than or equal to 700 μm, and more preferably greater than or equal to 300 μm and less than or equal to 450 μm.

Preferably, the average pore diameter ($S_Z$) in the thickness direction viewed from the side surface of the metal porous body is greater than or equal to 100 μm and less than or equal to 400 μm. The strength of the metal porous body can be increased when the average pore diameter ($S_Z$) is greater than or equal to 100 μm, furthermore, the gas diffusivity can be enhanced when the metal porous body is used as the gas diffusion layer of the fuel cell. The average pore diameter ($S_Z$) is less than or equal to 400 μm, which allows bendability of the metal porous body to be enhanced. From the viewpoint, preferably the average pore diameter ($S_Z$) of the metal porous body is greater than or equal to 100 μm and less than or equal to 350 μm, and more preferably greater than or equal to 100 μm and less than or equal to 250 μm.

(Rolling Method)

In the case where the metal porous body is used as the gas diffusion layer of the fuel cell, in order to reduce the size of the fuel cell and to enhance the gas diffusion performance, preferably, the metal porous body is compressed and rolled such that the thickness the metal porous body is greater than or equal to about 250 μm and less than or equal to about 1000 μm. Preferably, the rolling is performed using a rolling roller. In the case where the pore viewed from the main surface of the metal porous body becomes an ellipse even slightly, the rolling is performed in a direction parallel to the major axis direction of the ellipse such that the pore further becomes the ellipse.

A metal amount in the central portion in the thickness direction is generally small (the framework is thinned) when the metal porous body having the low weight per area is to be manufactured, and the central pore having the low metal amount tends to be crushed when the rolling is performed such that the thickness of the metal porous body is more than or equal to about 250 μm, and less than or equal to about 1000 μm. In order to prevent the crush of the central pore in the thickness direction, preferably, the rolling is performed with a rolling roller having a large roll diameter. In particular, the rolling can be performed with the rolling roller having the diameter greater than or equal to 300 mm such that the ratio ($S_z\text{max}/S_z\text{min}$) of the maximum value ($S_z\text{max}$) to the minimum value ($S_z\text{min}$) of the pore diameter in the thickness direction is less than or equal to 2.0. When a rolling roller having a small roll diameter is used, it is necessary to repeatedly perform the rolling in order to increase the compression ratio, but the number of times of the rolling can be decreased for the large roll diameter. This is significant for the hard metal porous body having corrosion resistance and heat resistance.

Typically, the metal porous body having the framework of the three-dimensional network structure is manufactured by electroplating the metal or alloy on the surface of the base material. In the metal porous body manufactured by the plating method, the central framework in the thickness direction is thinned and the strength tends to be weakened. When the roll diameter of the rolling roller is small in rolling the metal porous body, the central framework in the thickness direction having the weak strength collapses preferentially, and the pore diameter in the thickness direction is hardly made uniform. On the other hand, when the metal porous body is rolled using the rolling roller having the large roll diameter (preferably, the diameter greater than or equal to 300 mm), the metal porous body is gradually deformed and uniformly crushed when contacting with the roll, so that the pore diameter in the thickness direction can be made uniform.

Conventionally, in order to make the pore diameter in the thickness direction of the metal porous body uniform, it has been necessary to decrease the rolling ratio. In order to decrease the rolling ratio, it is necessary to thin the metal porous body before rolling. For example, when the metal porous body before rolling having the thickness of about 0.6 mm is to be manufactured, it is necessary to prepare a resin molded body (such as foamed urethane) having the thickness of about 0.6 mm. However, in the resin molded body having the thickness of about 0.6 mm, only about two pores can exist in the thickness direction, and the framework of the resin molded body comes to pieces, so that the preparation of the resin molded body having the thickness of about 0.6 mm is not realistic. Thus, conventionally, the metal porous body having the thickness of about 0.5 mm and the uniform pore diameter in the thickness direction cannot be manufactured.

On the other hand, as described above, the pore can uniformly be crushed in the thickness direction by rolling the metal porous body using the rolling roller having the large roll diameter. For this reason, according to the method of manufacturing a metal porous body of the embodiment of the present disclosure, the metal porous body having the thickness of about 0.5 mm and the uniform pore diameter in the thickness direction can be manufactured.

The major axis direction of the pore viewed from the main surface of the metal porous body may be disposed in parallel to the gas flow direction in order to use the metal porous body obtained as above as the gas diffusion of the fuel cell. Consequently, in the gas diffusion layer of the fuel cell, the gas diffusion performance can be enhanced and the pressure loss of the gas can be decreased. Retention of liquid water can be prevented in the gas diffusion layer.

For example, the metal porous body before rolling can be manufactured through a step of subjecting the surface of the framework of the resin molded body having the framework of the three-dimensional network structure to conduction treatment, a step of forming the metal or alloy layer on the surface of the framework of the resin molded body subjected to the conduction treatment, and a step of removing the resin molded body.

The method of manufacturing a metal porous body before rolling will be described in detail below.

(Resin Molded Body)

Figure 5:
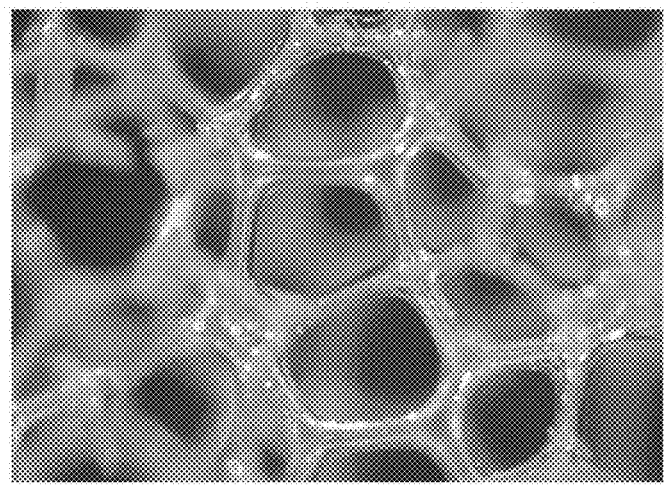
FIG. 5 is a photograph illustrating a foamed urethane resin of an example of a resin molded body having the framework of the three-dimensional network structure.

Preferably, a resin foam can be used as the resin molded body having the framework of the three-dimensional network structure. Any known or commercially available porous resin foam can be used. Examples of porous resin foam include foamed urethane and foamed styrene. Among others, foamed urethane is preferable from the viewpoint of particularly high porosity. FIG. 5 is a photograph illustrating the foamed urethane resin having the framework of the three-dimensional network structure.

The foamed urethane can be cut out by cutting a polyurethane foam block about every 1 m and by peeling the polyurethane foam block in a spiral shape around the horizontal or vertical direction as an axis. Preferably, the vertical direction is used as the axis because a height of only about 600 mm can be taken in the horizontal direction as the axis. The thickness, the porosity, and the average pore diameter of the resin foam are not restricted, and can appropriately be set.

In the polyurethane foam block, when the resin is foamed, the shape of the foam pores becomes long in the vertical direction due to the self-weight of the resin, viscosity, and the like. When the polyurethane foam block in the spiral shape is peeled to cut out the urethane foam sheet, preferably, the major axis direction of the foamed pores is set to the longitudinal direction of the foamed urethane sheet from the viewpoint of production efficiency.

A ratio ($U_X/U_Y$) of an average pore diameter ($U_X$) in the major axis direction to an average pore diameter ($U_Y$) in the minor axis direction of the pore viewed from the main surface of the foamed urethane sheet can be set within a range from 1.0 to 1.2 by applying tension in the longitudinal direction of the foamed urethane sheet in the step of continuously performing conduction treatment on the foamed urethane sheet or the step of plating the metal. The ratio ($S_X/S_Y$) of the average pore diameter ($S_X$) in the major axis direction to the average pore diameter ($S_Y$) in the minor axis direction of the pore viewed from the main surface of the metal porous body can be set greater than or equal to 1.4 and less than or equal to 2.5 by manufacturing the metal porous body using the foamed urethane sheet as the base material and by rolling the metal porous body.

Before the step of plating the metal, the foamed urethane sheet is stretched in one direction, and the metal or alloy is plated using the foamed urethane sheet in that state as the base material, which allows the ratio ($S_X/S_Y$) of the average pore diameter ($S_X$) in the major axis direction to the average pore diameter ($S_Y$) in the minor axis direction of the pore viewed from the main surface of the metal porous body to be greater than or equal to 1.4 and less than or equal to 2.5.

(Conduction Treatment)

Figure 6:
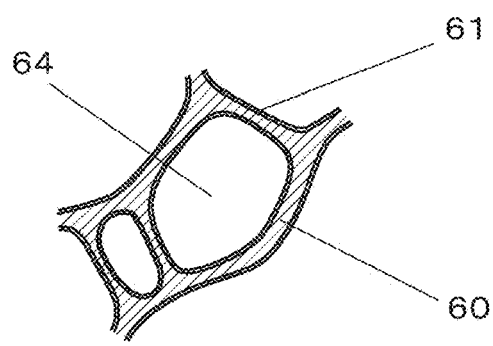
FIG. 6 is an enlarged view illustrating an outline of a partial cross-section of an example of a state in which a conductive layer is formed on a surface of the framework of the resin molded body having the framework of the three-dimensional network structure.

FIG. 6 is an enlarged view illustrating a partial cross-section of an example of the base material obtained by subjecting the resin molded body having the framework of the three-dimensional network structure to the conduction treatment. As illustrated in FIG. 6, a resin molded body 60 having the framework of the three-dimensional network structure has communicating pores, and a pore 64 is formed by the framework. Because the framework of the metal porous body is formed by forming the metal or alloy layer on the surface of the framework of resin molded body 60, the porosity, the average pore diameter, and the thickness of the metal porous body are substantially equal to the porosity, the average pore diameter, and the thickness of resin molded body 60. For this reason, the porosity, the average pore diameter, and the thickness of resin molded body 60 may appropriately be selected according to the porosity, the average pore diameter, and the thickness of the metal porous body that is a manufacturing purpose The porosity and the average pore diameter of resin molded body 60 are defined in the same manner as the porosity and the average pore diameter of the metal porous body.

The method of performing the conduction treatment on the surface of the framework of resin molded body 60 is not particularly limited as long as a conductive layer 61 having conductivity can be provided on the surface of the framework of resin molded body 60. Examples of the material constituting conductive layer 61 include metals such as nickel, tin, chromium, copper, iron, tungsten, titanium, and stainless steel, amorphous carbon such as carbon black, and carbon powder such as graphite. When conductive layer 61 is formed using amorphous carbon or carbon powder other than metal, conductive layer 61 is removed together in removing the resin molded body as necessary.

Specific examples of the conduction treatment include a method of forming a conductive layer on the surface of the framework of the resin molded body by application of a conductive coating obtained by adding a binder to a metal powder or a carbon powder, gas phase treatment such as sputtering, vapor deposition, and ion plating, and electroless plating treatment.

In the case where the conductive coating material containing the metal powder, the carbon powder or the like is applied, a method of applying a mixture of a powder having conductivity (for example, a powder of a metallic material such as stainless steel, crystalline graphite, or a carbon powder such as amorphous carbon black) and a binder to the surface of the framework of the resin molded body can be used. At this point, a tin powder and a carbon powder may be used, or a chromium powder or a chromium oxide powder and a carbon powder may be used.

For example, carbon black, activated carbon, and graphite can be used as the carbon powder, and the material is not particularly limited. The carbon black is used for the purpose of making the conductivity of the conductive layer formed on the surface of the framework of the resin molded body uniform, and a graphite fine powder is used in consideration of the strength of the conductive layer. It is preferable to mix activated carbon in the mixture. A thickener, such as carboxymethyl cellulose (CMC), generally used in preparing slurry may be added. The conductive layer can be formed on the surface of the framework of the resin molded body by applying the slurry to the framework of the resin molded body, which is cut into a plate shape or a belt shape while the thickness is adjusted, and by drying the slurry.

In the case where the conductive layer is formed by a sputtering process using nickel, tin, chromium, or the like, for example, after the resin molded body is attached to a substrate holder, a DC voltage is applied between a holder and a target (nickel, tin, chromium, or the like) while an inert gas is introduced. Consequently, the ionized inert gas collides with nickel, tin, chromium, or the like, and blown nickel particles, tin particles, chromium particles, or the like can be deposited on the surface of the framework of the resin molded body.

In the case where the conductive layer is formed by nickel-based electroless plating treatment, for example, the resin molded body is immersed in a known electroless nickel plating bath such as a nickel sulfate aqueous solution containing sodium hypophosphite as a reducing agent. As necessary, the resin molded body may be immersed in an activation liquid (a cleaning solution manufactured by Japan Kanigen Co., Ltd.) containing a trace amount of palladium ions or the like before the resin molded body is immersed in the plating bath.

An amount of weight per area (adhesion amount) of the conductive layer may appropriately be adjusted according to a final metal composition combined with the weight per area of the metal or alloy formed by nickel plating, tin plating, chromium plating, or the like in a later step.

In the case where nickel is used in the conductive layer, it is sufficient that the conductive layer is continuously formed on the surface of the framework of the resin molded body, but the amount of weight per area is not limited. Typically, the amount of weight per area is greater than or equal to about 5 $g/m^2$ and less than or equal to about 15 $g/m^2$, preferably greater than or equal to about 7 $g/m^2$ and less than or equal to about 10 $g/m^2$.

(Formation of Nickel Plating Layer)

Either electroless nickel plating or electrolytic nickel plating may be used to form the nickel plating layer, but the nickel plating layer is efficiently formed by the electrolytic plating. In the case where the electrolytic nickel plating is performed, the electrolytic nickel plating may be performed according to a conventional method. A known or commercially available plating bath can be used as the plating bath used in the electrolytic nickel plating, and examples of the known or commercially available plating bath include a watt bath, a chloride bath, and a sulfamic acid bath.

The resin molded body in which the conductive layer is formed on the surface of the framework by the electroless plating or sputtering is immersed in the plating bath, and the resin molded body is connected to a negative electrode while the nickel counter electrode plate is connected to a positive electrode such that DC or pulse intermittent current is passed, which allows the nickel plating layer to be further formed on the surface of the conductive layer. The amount of weight per area of the nickel plating layer may be adjusted according to the final metal or alloy composition of the metal porous body.

(Formation of Chromium Plating Layer)

Either the electrolytic plating or chromizing treatment may be used in the case where the chromium plating layer is formed on the surface of the framework of the resin molded body on which the nickel plating layer is formed. However, because an alloy can simultaneously be produced in the chromizing treatment, the chromizing treatment is efficient and preferable.

When the electrolytic plating is performed, the electrolytic plating may be performed according to a known chromium plating method, and a known or commercially available plating bath can be used. For example, a hexavalent chromium bath or a trivalent chromium bath can be used. The resin molded body to be plated is immersed in the chromium plating bath, the resin molded body is connected to the negative electrode while a chromium plate as the counter electrode is connected to the positive electrode, and the DC or pulse intermittent current is passed, which allows the chromium plating layer to be formed.

(Other Metals)

In the case where a metallic component other than nickel and chromium such as Sn (tin), W (tungsten), and Fe (iron) is contained in the framework of the metal porous body, a plating layer of these metals is formed on the surface of the framework, and the plating layer may be alloyed by heat treatment as necessary. The conductive coating containing these metal powders may be used in forming the conductive layer.

(Metal Porous Body in which Framework is Metal or Alloy Mainly Containing Aluminum)

The metal porous body having the framework formed of the metal or alloy mainly containing aluminum can also be manufactured by forming the aluminum plating layer instead of forming the nickel plating layer.

The aluminum plating can be performed by electrolysis (molten salt electrolysis) such that the resin molded body acts as the cathode in a molten salt bath.

For example, an organic molten salt that is a eutectic salt of an organic halide and an aluminum halide can be used as the molten salt. Examples of the organic halide include 1-ethyl-3-methylimidazolium chloride (EMIC) and butylpyridinium chloride (BPC). For example, examples of the aluminum halide may include aluminum chloride ($AlCl_3$).

(Removal of Resin Molded Body)

The method of removing the resin molded body used as the base material from the resin structure having the metal or alloy layer formed on the surface of the framework is not limited, but may include chemical treatment or a method of burning and removing by incineration, and the like. For the incineration, for example, heating may be performed in an oxidizing atmosphere such as atmosphere greater than or equal to about 600° C.

(Metal Porous Body in which Framework is Metal or Alloy Mainly Containing Titanium)

As described above, titanium is plated on the surface of the framework of the metal porous body having the framework made of the metal or alloy mainly containing nickel, which allows the manufacturing of the metal porous body having the titanium film formed on the surface of the framework. The metal porous body in which the titanium film is formed on the surface of nickel is treated with an acid or an alkali to remove nickel, which allows the manufacturing of the metal porous body having the framework made of the metal mainly containing titanium.

The titanium plating includes a metal ion of a group 1 metal, a fluoride ion, and a titanium ion. For example, titanium is further dissolved in a molten salt bath of at least one of lithium fluoride (LiF) and sodium fluoride (NaF) and at least one of lithium chloride (LiCl) and sodium chloride (NaCl), and the molten salt electrolysis is performed in the molten salt bath in which the titanium is dissolved with the metal porous body mainly containing nickel as the cathode, which allows titanium to be plated.

The titanium ion may be $Ti^{4-}$ or $Ti^{3+}$.

It is necessary to add titanium into the molten salt bath to cause a leveling reaction of $3Ti^{4-}+Ti\ metal \rightarrow 4Ti^{3+}$ in the molten salt bath. The amount of titanium added into the molten salt bath may be an amount exceeding the minimum amount necessary for $Ti^{4+}$ in the molten salt bath to be $Ti^{3+}$. By previously sufficiently dissolving titanium in the molten salt bath, it is possible to prevent electrodeposited titanium can be prevented from being dissolved in the molten salt bath during the subsequently-performed molten salt electrolysis.

Examples of the treatment with the acid or alkali include the immersion of the metal porous body having the titanium film formed on the surface of nickel in the acid or alkali.

For example, hydrochloric acid (HCl), sulfuric acid ($H_2SO_4$), sodium hydroxide (NaOH), or diluted nitric acid ($HNO_3$) can be used as the acid or alkali.

In the case where the framework of the metal porous body is made of the metal or alloy having the corrosion resistance or the heat resistance, sometimes the hard framework is difficult to be deformed by the rolling. In such a case, for example, the metal porous body having the framework made of nickel is rolled to deform the pore into a desired shape, and then alloying may be performed to impart the corrosion resistance and the heat resistance to the framework. In forming the metal porous body having the framework made of nickel, the tension is applied to the resin molded body used as the base material to deform the pore into the desired shape, and then the formation of the nickel plating layer and the alloying of nickel may be performed.

For example, in the case where the metal porous body having the framework made of NiCr (nickel chromium) is manufactured, first the nickel plating layer is formed on the surface of the framework of the resin molded body having the framework of the three-dimensional network structure to obtain a nickel porous body. Subsequently, the nickel porous body is rolled to deform the pore. At this point, the rolling is performed such that the ratio ($S_X/S_Y$) of the average pore diameter ($S_X$) in the major axis direction to the average pore diameter ($S_Y$) in the minor axis direction of the pore viewed from the main surface of the nickel porous body, the ratio ($S_X/S_Z$) of the average pore diameter ($S_X$) in the major axis direction to the average pore diameter ($S_Z$) in the thickness direction viewed from the side surface, and the ratio ($S_Z$max/$S_Z$min) of the maximum value ($S_Z$max) to the minimum value ($S_Z$min) of the pore diameter in the thickness direction viewed from the side surface of the metal porous body after rolling become desired values. Subsequently, the framework of the nickel porous body may be alloyed with chromium by a chromizing treatment or the like.

<Method of Producing Hydrogen and Hydrogen Producing Apparatus>

For example, the metal porous body obtained by the method of manufacturing a metal porous body of the embodiment of the present disclosure can be suitably used as the gas diffusion layer for the fuel cell or the electrode used to produce hydrogen by water electrolysis.

A method of producing hydrogen is roughly classified into [1] alkaline water electrolysis system, [2] PEM (Polymer Electrolyte Membrane) system, and [3] SOEC (Solid Oxide Electrolysis Cell) system. The metal porous body obtained by the method of manufacturing a metal porous body of the embodiment of the present disclosure has a high degassing property, so that the metal porous body can suitably be used in any system.

In the alkaline water electrolysis system [1], the positive electrode and the negative electrode are immersed in a strong alkaline aqueous solution, and water is electrolyzed by applying voltage. A contact area between water and the electrode is increased using the metal porous body as the electrode, and the efficiency of the water electrolysis can be enhanced.

In the method of producing hydrogen by the alkaline water electrolysis system, the metal porous body may be disposed and used such that the major axis direction of the pore viewed from the main surface of the metal porous body is parallel to a discharge direction of generated hydrogen.

The thickness of the metal porous body and the weight per area of the metal cause deflection when an electrode area becomes large, so that the thickness and the weight per area may appropriately be selected according to a facility scale. Preferably, the weight per area of the metal is greater than or equal to about 200 g/m$^2$ and less than or equal to about 2000 g/m$^2$, more preferably greater than or equal to about 300 g/m$^2$ and less than or equal to about 1,200 g/m$^2$, and further preferably greater than or equal to about 400 g/m$^2$ and less than or equal to 1000 g/m$^2$. A plurality of metal porous bodies having different average pore diameters may be used in combination in order to achieve compatibility between bubble escape and securing of a surface area.

The PEM system [2] is a method of electrolyzing water using a solid polymer electrolyte membrane. The positive electrode and the negative electrode are placed on both surfaces of the solid polymer electrolyte membrane, and the voltage is applied while water is caused to flow onto the positive electrode side, whereby the hydrogen ion generated by the water electrolysis moves onto the negative electrode side through the solid polymer electrolyte membrane, and is taken out as hydrogen on the negative electrode side. An operating temperature is about 100° C. The operation exactly opposite to the solid polymer electrolyte membrane is performed with the configuration similar to that of the solid polymer fuel cell that generates electric power using hydrogen and oxygen to discharge water. Because the positive electrode side and the negative electrode side are completely separated from each other, there is an advantage that high purity hydrogen can be taken out. It is necessary to cause water and the hydrogen gas to pass through both the positive electrode and the negative electrode, so that a conductive porous body is required for the electrode.

The metal porous body obtained by the method of manufacturing a metal porous body of the embodiment of the present disclosure has high porosity and good electrical conductivity, so that the metal porous body can suitably be used in not only the solid polymer fuel cell but also the PEM system water electrolysis. In the method of producing hydrogen by the PEM system, the metal porous body may be disposed and used such that the major axis direction of the pore viewed from the main surface of the metal porous body is parallel to the discharge direction of generated hydrogen.

The thickness of the metal porous body and the weight per area of the metal may appropriately be selected depending on the facility scale. However, because the loss of the pressure causing water to pass is increased when the porosity is extremely decreased, the thickness and the weight per area of the metal are adjusted such that the porosity is greater than or equal to 30%. In the PEM system, because the conduction between the solid polymer electrolyte membrane and the electrode is established by crimping, it is necessary to adjust the amount of weight per area of the metal such that an increase in electrical resistance due to deformation and creep during pressurization falls within a practically acceptable range. Preferably, the weight per area of the metal is greater than or equal to about 200 g/m$^2$ and less than or equal to about 2000 g/m$^2$, more preferably greater than or equal to about 300 g/m$^2$ and less than or equal to about 1,200 g/m$^2$, and further preferably greater than or equal to about 400 g/m$^2$ and less than or equal to 1000 g/m$^2$. The plurality of metal porous bodies having different average pore diameters may be used in combination in order to achieve compatibility between securing of the porosity and the electrical connection.

The SOEC system [3] is a method of electrolyzing water using a solid oxide electrolyte membrane, and an organization depends on whether the electrolyte membrane is a proton conductive membrane or an oxygen ion conductive membrane. In the oxygen ion conductive membrane, hydrogen is generated on the negative electrode side that supplies water vapor, so that the hydrogen purity is degraded. For this reason, preferably, the proton conductive membrane is used from the viewpoint of hydrogen production.

The positive electrode and the negative electrode are placed on both sides of the proton conductive membrane, and the voltage is applied while the water vapor is introduced onto the positive electrode side, whereby the hydrogen ion generated by the water electrolysis moves onto the negative electrode side through the solid polymer electrolyte membrane, and only hydrogen is taken out on the negative electrode side. The operating temperature is greater than or equal to about 600° C. and less than or equal to about 800° C. The operation exactly opposite to the solid polymer electrolyte membrane is performed with the configuration similar to that of the solid oxide fuel cell that generates electric power using hydrogen and oxygen to discharge water.

It is necessary to cause the water vapor and the hydrogen gas to pass through both the positive electrode and the negative electrode, so that a conductive porous body withstanding a high-temperature oxidation atmosphere particularly on the positive electrode side is required for the electrode. The metal porous body obtained by the method of manufacturing a metal porous body of the embodiment of the present disclosure has the high porosity, the good electrical conductivity, the high oxidation resistance, and the high heat resistance, so that the metal porous body can suitably be used in not only the solid oxide fuel cell but also the SOEC system water electrolysis. Preferably, the metal porous body containing chromium or tin is used because the high oxidation resistance is required for the electrode on the side of the oxidation atmosphere.

In the method of producing hydrogen by the SOEC system, the metal porous body may be disposed and used such that the major axis direction of the pore viewed from the main surface of the metal porous body is parallel to the discharge direction of generated hydrogen.

The thickness of the metal porous body and the weight per area of the metal may appropriately be selected depending on the facility scale. However, because the pressure loss for inputting the water vapor increases when the porosity is extremely decreased, the thickness and the weight per area of the metal are adjusted such that the porosity is greater than or equal to 30%. In the SOEC system, because the conduction between the solid oxide electrolyte membrane and the electrode is established by crimping, it is necessary to adjust the amount of weight per area of the metal such that an increase in electrical resistance due to deformation and creep during pressurization falls within a practically acceptable range. Preferably, the weight per area of the metal is greater than or equal to about 200 g/m$^2$ and less than or equal to about 2000 g/m$^2$, more preferably greater than or equal to about 300 g/m$^2$ and less than or equal to about 1,200 g/m$^2$, and further preferably greater than or equal to about 400 g/m$^2$ and less than or equal to 1000 g/m$^2$. The plurality of metal porous bodies having different average pore diameters may be used in combination in order to achieve compatibility between securing of the porosity and the electrical connection.

<Appendix>

The above description includes the features described below.

(Appendix 1)

A method of producing hydrogen in which hydrogen is generated by electrolyzing water using a flat plate-shaped metal porous body having a framework of a three-dimensional network structure as an electrode, the framework is made of metal or alloy, and in the metal porous body, a ratio (X/Y) of an average pore diameter (X) in a direction parallel to a hydrogen discharge direction to an average pore diameter (Y) in a direction perpendicular to the hydrogen discharge direction is greater than or equal to 1.4 and less than or equal to 2.5.

(Appendix 2)

The method of producing hydrogen according to Appendix 1, in which in the metal porous body, a ratio (X/Z) of the average pore diameter (X) in the direction parallel to the hydrogen discharge. direction to an average pore diameter (Z) in a thickness direction of the metal porous body is greater than or equal to 2.0 and less than or equal to 4.0.

(Appendix 3)

The method of producing hydrogen according to Appendix 1 or 2, in which in the metal porous body, a ratio (Zmax/Zmin) of a maximum value (Zmax) to a minimum value (Zmin) of a pore diameter in the thickness direction is less than or equal to 2.0.

(Appendix 4)

The method of producing hydrogen according to any one of Appendixes 1 to 3, in which the water is a strongly alkaline aqueous solution.

(Appendix 5)

The method of producing hydrogen according to any one of Appendixes 1 to 3, in which the metal porous body is disposed on both sides of a solid polymer electrolyte membrane to bring the solid polymer electrolyte membrane and the metal porous body into contact with each other, the metal porous bodies act as a positive electrode and a negative electrode, water is supplied onto a positive electrode side to perform electrolysis, and hydrogen is generated on a negative electrode side.

(Appendix 6)

The method of producing hydrogen according to any one of Appendixes 1 to 3, in which the metal porous body is disposed on both sides of a solid oxide electrolyte membrane to bring the solid oxide electrolyte membrane and the metal porous body into contact with each other, the metal porous bodies act as a positive electrode and a negative electrode, water vapor is supplied onto a positive electrode side to electrolyze water, and hydrogen is generated on a negative electrode side.

(Appendix 7)

A hydrogen producing apparatus capable of generating hydrogen by electrolyzing water, the hydrogen producing apparatus including a flat plate-shaped metal porous body having a framework of a three-dimensional network structure as an electrode, the framework is made of metal or alloy, and in the metal porous body, a ratio (X/Y) of an average pore diameter (X) in a direction parallel to a hydrogen discharge direction to an average pore diameter (Y) in a direction perpendicular to the hydrogen discharge direction is greater than or equal to 1.4 and less than or equal to 2.5.

(Appendix 8)

The hydrogen producing apparatus according to Appendix 7, in which in the metal porous body, a ratio (X/Z) of the average pore diameter (X) in the direction parallel to the hydrogen discharge direction to an average pore diameter (Z) in a thickness direction of the metal porous body is greater than or equal to 2.0 and less than or equal to 4.0.

(Appendix 9)

The hydrogen producing apparatus according to Appendix 7 or 8, in which in the metal porous body, a ratio (Zmax/Zmin) of a maximum value (Zmax) to a minimum value (Zmin) of a pore diameter in the thickness direction is less than or equal to 2.0.

(Appendix 10)

The hydrogen producing apparatus according to any one of Appendixes 7 to 9, in which the water is a strongly alkaline aqueous solution.

(Appendix 11)

The hydrogen producing apparatus according to any one of Appendixes 7 to 9, the hydrogen producing apparatus including a positive electrode and a negative electrode on both sides of a solid polymer electrolyte membrane, the positive electrode and the negative electrode are in contact with the solid polymer electrolyte membrane, hydrogen can be generated on a negative electrode side by electrolyzing water supplied onto a positive electrode side, and the metal porous body is used in at least one of the positive electrode and the negative electrode.

(Appendix 12)

The hydrogen producing apparatus according to any one of Appendixes 7 to 9, the hydrogen producing apparatus including a positive electrode and a negative electrode on both sides of a solid oxide electrolyte membrane, the positive electrode and the negative electrode are in contact with the solid polymer electrolyte membrane, hydrogen can be generated on a negative electrode side by electrolyzing water vapor supplied onto a positive electrode side, and the metal porous body is used in at least one of the positive electrode and the negative electrode.

EXAMPLES

Hereinafter, the present disclosure will be described in more detail based on examples, but these examples are illustrative, and the fuel cell of the present disclosure is not limited to the examples. The scope of the present invention is indicated only by the claims, and includes meanings equivalent to the claims and all changes within the scope.

Example 1

CELMET (registered trademark) manufactured by Sumitomo Electric Industries, Ltd. was prepared as the metal porous body before rolling having the framework of the three-dimensional network structure. The size of the metal porous body was 100 mm×100 mm×1.0 mmt, the pore viewed from the main surface was slightly elliptical in the longitudinal direction, the average pore diameter ($S_X$) in the major axis direction was 0.56 mm, and the average pore diameter ($S_Y$) in the minor axial direction was 0.46 mm. The porosity was 95%.

Using the rolling roller having the diameter of 450 mm, the metal porous body was rolled along the major axis direction of the pore viewed from the main surface so as to have the thickness of 0.50 mm, and a metal porous body No. 1 was obtained.

The metal porous body No. 1 (after rolling) had the average pore diameter ($S_X$) of 0.62 mm in the major axis direction, the average pore diameter ($S_Y$) of 0.42 mm in the minor axis direction, and the porosity of 91%.

Measured values before rolling of the metal porous body No. 1 are illustrated in Table 1, and measured values after rolling are illustrated in Table 2.

Example 2

The metal porous body having the average pore diameter ($S_X$) of 0.55 mm in the major axis direction, the average pore diameter ($S_Y$) of 0.38 mm in the minor axis direction, and the porosity of 96% was used as the metal porous body before rolling, and a metal porous body No. 2 was obtained in the manner similar to Example 1 except that compression was performed such that the thickness became 0.70 mm.

The metal porous body No. 2 (after rolling) had the average pore diameter ($S_X$) of 0.61 mm in the major axis direction, the average pore diameter ($S_Y$) of 0.35 µm in the minor axis direction, and the porosity of 93%.

The measured values before rolling of the metal porous body No. 2 are illustrated in Table 1, and the measured values after rolling are illustrated in Table 2.

Example 3

The metal porous body having the average pore diameter ($S_X$) of 0.64 mm in the major axis direction, the average pore diameter ($S_Y$) of 0.33 mm in the minor axis direction, and the porosity of 96% was used as the metal porous body before rolling, and a metal porous body No. 3 was obtained in the manner similar to Example 1 except that compression was performed such that the thickness became 0.80 mm.

The metal porous body No. 3 (after rolling) had the average pore diameter ($S_X$) of 0.71 mm in the major axis direction, the average pore diameter ($S_Y$) of 0.30 µm in the minor axis direction, and the porosity of 94%.

The measured values before rolling of the metal porous body No. 3 are illustrated in Table 1, and the measured values after rolling are illustrated in Table 2.

Example 4

A metal porous body No. 4 was obtained in the manner similar to Example 3 except that the metal porous body having the thickness of 1.40 mm was used as the metal porous body before rolling.

The measured values before rolling of the metal porous body No. 4 are illustrated in Table 1, and the measured values after rolling are illustrated in Table 2.

Example 5

A metal porous body No. 5 was obtained in the manner similar to Example 3 except that the metal porous body having the thickness of 1.60 mm was used as the metal porous body before rolling.

The measured values before rolling of the metal porous body No. 5 are illustrated in Table 1, and the measured values after rolling are illustrated in Table 2.

Example 6

A metal porous body No. 6 was obtained in the manner similar to Example 1 except that the rolling roller having the diameter of 250 mm was used.

The measured values before rolling of the metal porous body No. 6 are illustrated in Table 1, and the measured values after rolling are illustrated in Table 2.

Comparative Example 1

A metal porous body No. A was obtained in the manner similar to Example 1 except that the metal porous body having the average pore diameter ($S_X$) of 0.55 mm in the major axis direction, the average pore diameter ($S_Y$) of 0.45 mm in the minor axis direction, and the thickness of 1.20 mm was used as the metal porous body before rolling.

The metal porous body No. A (after rolling) had the average pore diameter ($S_X$) of 0.60 mm in the major axis direction, the average pore diameter ($S_Y$) of 0.50 µm in the minor axis direction, and the porosity of 91%.

The measured values before rolling of the metal porous body No. A are illustrated in Table 1, and the measured values after rolling are illustrated in Table 2.

Comparative Example 2

A metal porous body No. B was obtained in the manner similar to Example 1 except that the metal porous body having the average pore diameter ($S_X$) of 0.47 mm in the major axis direction and the average pore diameter ($S_Y$) of 0.25 mm in the minor axis direction was used as the metal porous body before rolling.

Because the metal porous body No. B (after rolling) was forcedly rolled such that the major axis direction of the pore became longer, a crack was generated in a part of the framework, and the metal porous body No. B did not withstand use. In a portion in which the shape of the framework is maintained in the metal porous body No. B (after rolling), the average pore diameter ($S_X$) in the major axis direction was 0.75 mm, the average pore diameter ($S_Y$) in the minor axis direction was 0.28 μm, and the porosity was 91%.

The measured values before rolling of the metal porous body No. B are illustrated in Table 1, and the measured values after rolling are illustrated in Table 2.

—Evaluation—

Figure 7:
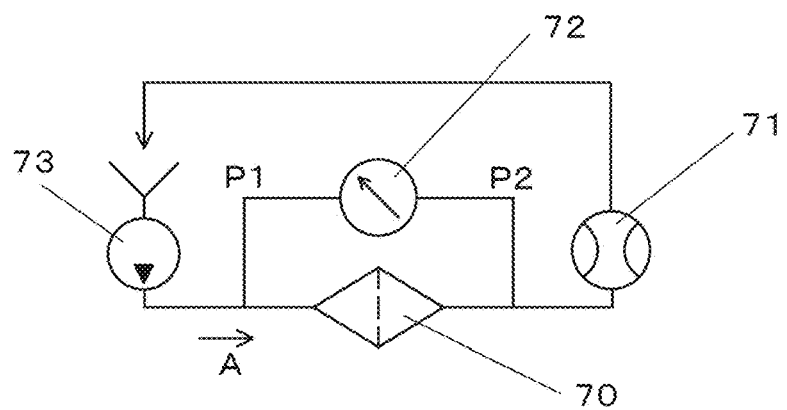
FIG. 7 is a view illustrating a device that measures a pressure loss when a gas is supplied to the metal porous body.

The pressure loss was measured by supplying the gas to the metal porous bodies No. 1 to No. 6 and the metal porous body No. A to perform a flow rate-pressure loss test. Specifically, as illustrated in the circuit diagram of FIG. 7, the gas was supplied from a pump 73 to a test sample (metal porous body) 70 such that the flow rate became 0.5 L/min, and pressure P1 before the gas passes through test sample (metal porous body) 70 and the pressure P2 after the gas passed through test sample (metal porous body) 70 were measured with a pressure measuring instrument 72. A pressure loss ΔP in each test sample (metal porous body) 70 was calculated as P1-P2. The flow rate of the gas was measured by a flowmeter 71. The gas flow direction in each metal porous body was made parallel to the major axis direction of the pore of each metal porous body. The metal porous body No. B did not withstand the use as described above, so that the measurement was not performed.

TABLE 1

| | Before rolling | | | | | | | |
|---|---|---|---|---|---|---|---|---|
| Metal porous body No. | Average pore diameter in major axis direction ($S_X$) mm | Average pore diameter in minor axis direction ($S_Y$) mm | Average pore diameter in thickness direction ($S_Z$) mm | Ratio of average pore diameter in major axis direction to average pore diameter in minor axis direction ($S_X/S_Y$) | Ratio of average pore diameter in major axis direction to average pore diameter in thickness direction ($S_X/S_Z$) | Porosity (%) | Thickness (mm) | The number of pores in thickness direction (pieces) |
| 1 | 0.56 | 0.46 | 0.46 | 1.22 | 1.22 | 95 | 1.00 | 1.96 |
| 2 | 0.55 | 0.38 | 0.38 | 1.45 | 1.45 | 96 | 1.00 | 2.17 |
| 3 | 0.64 | 0.33 | 0.33 | 1.94 | 1.94 | 96 | 1.00 | 2.17 |
| 4 | 0.64 | 0.33 | 0.33 | 1.94 | 1.94 | 96 | 1.40 | 3.04 |
| 5 | 0.64 | 0.33 | 0.33 | 1.94 | 1.94 | 96 | 1.60 | 3.48 |
| 6 | 0.56 | 0.46 | 0.46 | 1.22 | 1.22 | 95 | 1.00 | 1.96 |
| A | 0.55 | 0.45 | 0.45 | 1.22 | 1.22 | 95 | 1.20 | 1.96 |
| B | 0.47 | 0.25 | 0.25 | 1.88 | 1.88 | 95 | 1.00 | 1.96 |

TABLE 2

| | After rolling | | | | | | |
|---|---|---|---|---|---|---|---|
| Metal porous body No. | Average pore diameter in major axis direction ($S_X$) mm | Average pore diameter in minor axis direction ($S_Y$) mm | Average pore diameter in thickness direction ($S_Z$) mm | Ratio of average pore diameter in major axis direction to average pore diameter in minor axis direction ($S_X/S_Y$) | Ratio of average pore diameter in major axis direction to average pore diameter in thickness direction ($S_X/S_Z$) | Porosity (%) | Rolling roller diameter (mm) |
| 1 | 0.62 | 0.42 | 0.23 | 1.46 | 2.68 | 91 | 450 |
| 2 | 0.61 | 0.35 | 0.27 | 1.74 | 2.26 | 93 | 450 |
| 3 | 0.71 | 0.30 | 0.26 | 2.37 | 2.70 | 94 | 450 |
| 4 | 0.71 | 0.30 | 0.19 | 2.37 | 3.77 | 94 | 450 |
| 5 | 0.71 | 0.30 | 0.17 | 2.37 | 4.31 | 94 | 450 |
| 6 | 0.62 | 0.42 | 0.23 | 1.46 | 2.68 | 91 | 250 |
| A | 0.60 | 0.50 | 0.19 | 1.20 | 3.17 | 91 | 450 |
| B | 0.75 | 0.28 | 0.13 | 2.80 | 5.89 | 91 | 450 |

| | After rolling | | | | | | |
|---|---|---|---|---|---|---|---|
| Metal porous body No. | Thickness (mm) | The number of pores in thickness direction (pieces) | Maximum value of pore diameter in thickness direction $S_Z$max (mm) | Minimum value of pore diameter in thickness direction $S_Z$min (mm) | $S_Z$max/ $S_Z$min | Gas pressure loss in major axis direction (%) | Gas pressure loss in minor axis direction (%) |
| 1 | 0.50 | 1.96 | 0.25 | 0.21 | 1.22 | 15 | 18 |
| 2 | 0.70 | 2.17 | 0.30 | 0.24 | 1.22 | 11 | 13 |
| 3 | 0.80 | 2.17 | 0.29 | 0.24 | 1.22 | 9 | 11 |
| 4 | 0.80 | 3.04 | 0.21 | 0.17 | 1.22 | 13 | 16 |
| 5 | 0.80 | 3.48 | 0.18 | 0.15 | 1.22 | 15 | 18 |
| 6 | 0.50 | 1.96 | 0.25 | 0.12 | 2.11 | 18 | 22 |
| A | 0.50 | 1.96 | 0.21 | 0.17 | 1.22 | 25 | 30 |
| B | 0.50 | 1.96 | 0.14 | 0.11 | 1.22 | — | — |

As illustrated in Table 2, in the metal porous bodies Nos. 1 to 6 obtained by the method of manufacturing a metal porous body of the embodiment of the present disclosure, the gas pressure loss was small even if the thickness was reduced. For this reason, in the case where the metal porous bodies Nos. 1 to 6 were used as the gas diffusion layer of the fuel cell, the metal porous bodies Nos. 1 to 6 contribute to miniaturization of the fuel cell, and has the high gas diffusion performance and a small pressure loss, so that the high-output fuel cell can be obtained.

For reference, the pressure loss was measured in the manner similar to the above method except that the gas is caused to flow in a direction parallel to the minor axis direction of the pore of the metal porous bodies Nos. 1 to 6. The results are illustrated in Table 2. In any one of the metal porous bodies, the pressure loss is larger in the case of causing the gas to flow in the direction parallel to the minor axis direction of the pore than in the case of causing the gas to flow in the direction parallel to the major axis direction.

—Observation of Behavior of Condensed Water Droplets When Humidified Gas is Supplied to Metal Porous Body—

A humidified oxygen gas at a temperature of 80° C. was supplied from pump 73 to test sample (each metal porous body) 70 such that the flow rate was 0.5 L/min, and a water pool of the metal porous body was visually observed after 10 minutes. The humidified oxygen gas was caused to flow in the direction parallel to the major axis direction of the pores of the metal porous bodies Nos. 1 to 6.

As a result, in the metal porous bodies Nos. 1 to 6, the condensed water droplets were not accumulated in the pores, but were promptly discharged along with an airflow. On the other hand, in metal porous body No. A, the condensed water droplets accumulated in the pore, and the discharge performance was poor.

When the humidified oxygen gas was caused to flow in the direction parallel to the minor axis direction of the pores of the metal porous bodies Nos. 1 to 6, the condensed water droplets were accumulated in the pore similarly to the metal porous body No. A, and the discharge performance of water was poor.

REFERENCE SIGNS LIST

10: metal porous body, 11: metal or alloy, 12: framework, 13: inside of framework, 14: pore, 60: resin molded body, 61: conductive layer, 64: pore, A: gas flow direction, 70: test sample (metal porous body), 71: flowmeter, 72: pressure measuring instrument, 73: pump

The invention claimed is:

1. A fuel cell comprising a flat plate-shaped metal porous body having a framework of a three-dimensional network structure as a gas diffusion layer,
wherein the framework is made of metal or alloy,
wherein the flat plate-shaped metal porous body includes pores surrounded by the framework,
wherein the framework has a hollow inside and a metal layer separating the hollow inside from the pores, and
in the metal porous body, a ratio of an average pore diameter in a direction parallel to a gas flow direction to an average pore diameter in a direction perpendicular to the gas flow direction is greater than or equal to 1.4 and less than or equal to 2.5.

2. The fuel cell according to claim 1, wherein in the metal porous body, a ratio of the average pore diameter in the direction parallel to the gas flow direction to an average pore diameter in a thickness direction of the metal porous body is greater than or equal to 2.0 and less than or equal to 4.0.

3. The fuel cell according to claim 1, wherein in the metal porous body, a ratio of a maximum value to a minimum value of a pore diameter in the thickness direction is less than or equal to 2.0.

4. A method of manufacturing a metal porous body, comprising:
forming a flat plate-shaped metal porous body by preparing a resin molded body having a framework of a three-dimensional network structure and pores surrounded by the framework, forming a metal layer on a surface of the pores, and removing the resin molded body; and
compressing and rolling the flat plate-shaped metal porous body in a thickness direction, such that a ratio of an average pore diameter in a major axis direction to an average pore diameter in a minor axis direction of a pore viewed from a main surface of the metal porous body after the rolling is greater than or equal to 1.4 and less than or equal to 2.5.

5. The method of manufacturing a metal porous body according to claim 4, wherein the rolling is performed such that a ratio of the average pore diameter in the major axis direction of the pore viewed from the main surface of the metal porous body after the rolling to an average pore diameter in the thickness direction viewed from a side surface is greater than or equal to 2.0 and less than or equal to 4.0.

6. The method of manufacturing a metal porous body according to claim 4, wherein the rolling is performed such that a ratio of a maximum value to a minimum value of a pore diameter in the thickness direction viewed from the side surface of the metal porous body after the rolling is less than or equal to 2.0.

7. The method of manufacturing a metal porous body according to claim 4, wherein the rolling is performed using a rolling roller having a diameter greater than or equal to 300 mm.

* * * * *